United States Patent [19]

Urano et al.

[11] 4,067,033
[45] Jan. 3, 1978

[54] CORRECTING DEVICE FOR CAMERAS WITH AUTOMATIC EXPOSURE CONTROL

[75] Inventors: Fumio Urano, Omiya; Junji Umetsu, Tokyo, both of Japan

[73] Assignee: Asahi Kogaku Kogyo Kabushiki Kaisha, Tokyo, Japan

[21] Appl. No.: 695,299

[22] Filed: June 11, 1976

[30] Foreign Application Priority Data

June 23, 1975 Japan ............................ 50-87063[U]

[51] Int. Cl.² ............................................ G03B 17/00
[52] U.S. Cl. ...................................... 354/289; 354/58
[58] Field of Search ......................... 354/289, 58, 28; 116/114 J

[56] References Cited

U.S. PATENT DOCUMENTS

| | | |
|---|---|---|
| 3,947,862 | 3/1976 | Watanabe et al. ................. 354/289 |
| 3,956,763 | 5/1976 | Yamanaka ....................... 354/289 |

Primary Examiner—John Gonzales
Attorney, Agent, or Firm—Sughrue, Rothwell, Mion, Zinn and Macpeak

[57] ABSTRACT

A dial mechanism in a camera is disclosed having the capability of indicating multiple related settings, all of which control a single transducer input to an exposure control rotation of one or more indicating rings in dependence upon manually actuable control elements.

4 Claims, 4 Drawing Figures

CORRECTING DEVICE FOR CAMERAS WITH AUTOMATIC EXPOSURE CONTROL

BACKGROUND OF THE INVENTION

This invention relates to apparatus for controlling the exposure corrections in cameras having automatic exposure controls.

In automatic exposure controlled cameras, the apex indicating values $B_V$, $A_V$ and $S_V$ of brightness of an object to be photographed, diaphragm value of the lens, and the sensitivity of the film, respectively, are utilized in an electronic circuit which determines and controls the shutter speed T (apex value $T_V$) according to the apex indicating formula: $T_V = B_V + S_V - A_V$.

When the values $B_V$, $A_V$ and $S_V$ have been determined, the shutter speed becomes fixed in accordance with those values, irrespective of the photographer's intention, in special cases, to provide a different exposure. For example, when taking a photograph of a person against a very bright background, e.g. snow-crowned mountains, the above formula will result in the shutter speed being too great for proper photography of the person. This is because the background results in a large value of $B_V$. Thus a deviation or error exists between a proper exposure value intended to be determined by the photographer and an exposure value automatically determined by the camera, so that it becomes necessary to correct the electric information manually. This type of correction is commonly referred to as a correction of exposure. One method of accomplishing exposure correction is to alter the value of $S_V$ set in the camera. For example, if the film speed dial of a camera is set for film of ASA 200 ($S_V=6$), when the film in the camera has an ASA of 100 ($S_V=5$), the shutter speed determined by the circuitry will be halved so that the face of the person who backs against snow-covered mountains will not be underexposed on the film. A problem with this technique is that the film sensitivity indicated is not the true film sensitivity, and errors can result from if the photographer does not remember the true sensitivity of the film loaded in the camera. Therefore, so-called $X_V$ devices have been employed for the exclusive use of making exposure corrections.

Another instance of corrections which the camera can not effect automatically are those which may be considered as being dependent upon the technical level of photographers. Thus, for example, a given photographer with experience may prefer to take all or most photographs at an exposure slightly in excess or slightly below that exchange lens group and the kind of film to be used in a which would be automatically set by the camera based on film speed, brightness, and operature opening. Such correction, which is referred to as setting a reference level, can be made by means of the above-mentioned $X_V$ device. However, because the purpose of the correction in this instance is different than the purpose of typical $X_V$ correction confusion can occur caused in the course of correction of the value $X_V$, first as in the case of correction of the value $S_V$. In brief, since the photographer employs a certain kind of lens, when it is desired to correct the reference level by one $E_V$ and take a photograph with a correction made by means of the $X_V$ device, and where it is necessary to make a further correction by means of the $X_V$ device for the purpose of effecting a correction under the above-mentioned photographing conditions, the reference level will deviate from the original value and so confusion is liable to occur. For this reason, it is convenient to separately provide a device capable of effecting correction of reference level (including the indication thereof). This will be referred to hereinbelow as the $O_V$ device.

SUMMARY OF THE INVENTION

The present invention has for its object to provide an effective correcting device for cameras by installing in combination the above-mentioned $X_V$ and $O_V$ correcting devices and incorporating the two sets of devices in a film speed setting device, $S_V$, which incorporates a transducer for converting the settings into an electrical quantity for use in the exposure control circuit.

The object is achieved by providing a construction wherein three rings for setting $S_V$, $X_V$, and $O_V$, respectively, are mechanically interrelated so as to control a single transducer, while at the same time being individually set by the operator.

DETAILED DESCRIPTION

Figure 1:
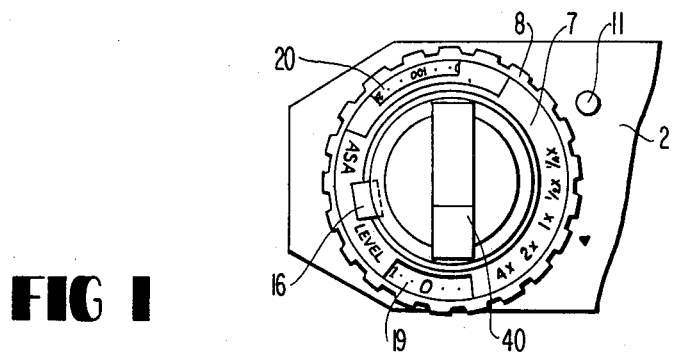
FIG. 1 is a top view of a setting dial, in accordance with the present invention, for setting and indicating the $S_V$, $X_V$ and $O_V$ selections.

In FIG. 1 there is shown a dial protruding above the top of the camera housing 2. The dial is capable of individually selecting an $X_V$ value, an $O_V$ value, and an $S_V$ value. The $X_V$ value is indicated by a pointer on body 2 which points to an $X_V$ number on an $X_V$ indicating ring 7. The $O_V$ value is indicated by a pointer on ring 7 which points to an $O_V$ number on an $O_V$ indicator ring 19. The latter numbers are visible through a window in ring 7. The $S_V$ value (i.e., film ASA or DIN) is indicated by a pointer on ring 19 which points to an $S_V$ number on an $S_V$ indicator ring 20. The latter numbers are visible through windows in rings 19 and 7. It is noted that the $S_V$ viewing window in ring 7 must be larger that the $S_V$ viewing window in ring 19 to permit $S_V$ viewing irrespective of the relative positions of rings 7 and 19 resulting from the $O_V$ selection.

Also in FIG. 1 there are shown, an $O_V$ unlocking lever 16, an $X_V$ unlocking member 11, and a film rewind crank 40. Although the dial is arranged around the film winding crank in the embodiment shown, this is for the purpose of conserving space and is not a requirement for the practice of the present invention. All thru indicator rings, 7, 19 and 20, can be rotated by turning the operating ring 8. Lever 16 and pin 11 provide controls for selecting which of the rings rotate and which are held stationary. Any rotation of operating ring 8, however, moves a moveable contact of a variable resistor to alter the value set into the electronic exposure control circuit (not shown).

Figure 2:
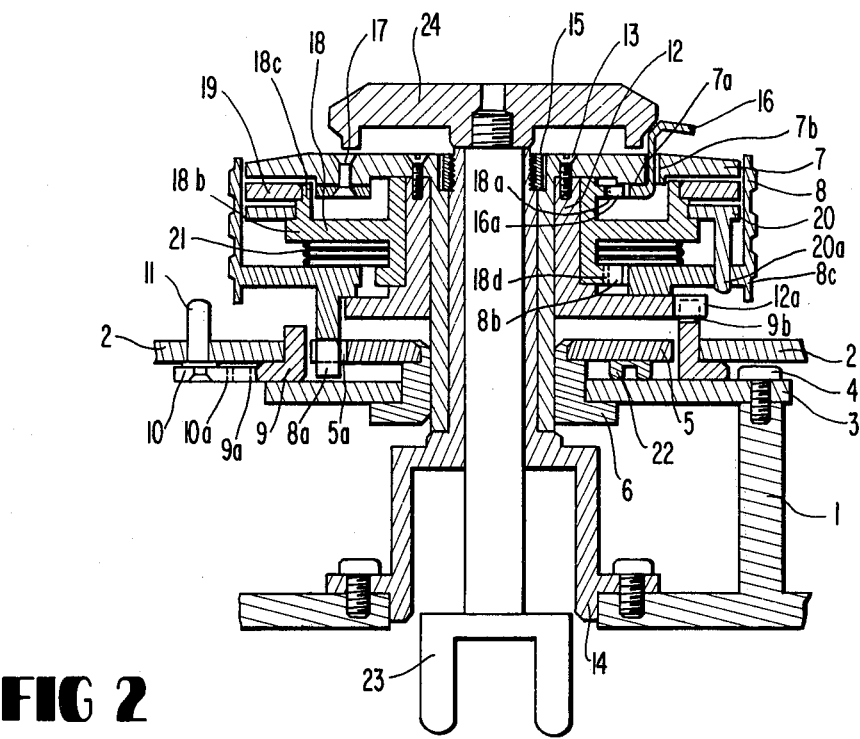
FIG. 2 is a cross sectional side view of the setting mechanism in accordance with the present invention.

In FIG. 2 there is shown the moveable contact 22, which moves along a resistance formed on plate 3. The plate 3 is attached to a camera body 1 by means of a setscrew 4. An insulator 5 is fixedly secured to a bearing 6, and the contact 22 is secured to the insulator 5 by means of screws not shown. A projecting portion 8a of the operating ring 8 is fitted into recess 5a of the insulator 5 so as to be rotationally interlocked therewith. The contact 22 and the operating ring 8 rotate as an integral unit about, the $X_V$ indicator ring 7 and contact 22 slides on the plate 3.

An $X_V$ interlocking ring 9 is sandwiched between the upper cover plate 2 and the plate 3 and is adapted to rotate in contact with the inside of the cover plate 2. An $X_V$ locking member 10 has a projecting portion 10a which is inserted into a recess 9a of the $X_V$ interlocking ring 9, to prevent rotation or the latter, when member 10 is in the locking position illustrated. Further, a projecting portion 9b of the $X_V$ interlocking ring 9 is fitted into a recess 12a of an $X_V$ interlocking ring 12, and the latter is fixedly secured to the $X_V$ indicator ring 7 by means of setscrews 13. An $X_V$ unlocking button 11 which is attached to the cover plate 2 by a spring plate (not shown) is attached at the bottom thereof to locking member 10. Depression of the button moves the locking member 10 and the projecting portion 10a out of engagement with the recess 9a of the $X_V$ interlocking ring 9. This permits rings 9, 12 and 7 to rotate. The $X_V$ indicator ring 7 is prevented from vertical play, by screwing setscrews 15 into an unwinding shaft bearing 14, and is permitted to rotate about the unwinding shaft bearing 14.

Figure 3:
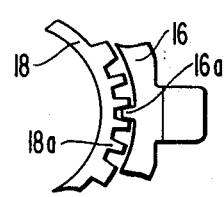
FIGS. 3 and 4 are top views of parts of the mechanism of FIG. 2 illustrating the lacking arrangement between certain rings.
Figure 4:
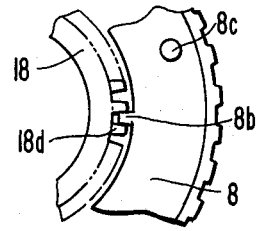

The $O_V$ unlocking lever 16 is secured to the $X_V$ indicator ring 7 by means of fixing members 17. The $O_V$ unlocking lever 16 rests against projecting portion 7a of the $X_V$ indicator ring 7 and extends through a groove 7b therein to form a handle which can be depressed by the operator. Moreover, a projecting portion 16a of the $O_V$ unlocking lever lever 16 is engaged with a recess 18a of an $O_V$ interlocking ring 18, as shown in detail in FIG. 3, and such engagement can be unlocked by the operator depressing the $O_V$ unlocking lever 16. Further, the inner part of the $O_V$ interlocking ring 18 rests against the $X_V$ interlocking ring 12 and is positioned just below the $X_V$ indicator ring 7. The ring 18 is capable of rotating relative to ring 12. One end 18b of the $O_V$ interlocking ring 18 rests against the buttom and inner diameter of the $S_V$ indicator ring 20 to position the latter. One upper end 18c of ring 18 secures the $O_V$ indicator ring 19 fixedly so that the $O_V$ interlocking ring and the $O_V$ indicator ring 19 rotate as an integral unit. Further, as best shown in FIG. 4, the $O_V$ interlocking ring 18 is engaged with the operating ring 8 by means of projecting part 8b of ring 8 and recess 18d of ring 18. The operating ring 8 rests at its lower part against the $X_V$ interlocking ring 12, and is controlled or positioned at its upper part by a coiled spring 21. Raising operating ring 8 unlocks the lock between rings 8 and 18. Projecting portion 20a of the $S_V$ indicator ring 20 is fitted into the hole 8c of the operating rod 8 shown also in FIG. 4 so that the $S_V$ indicator ring 20 can rotate with the operating rod 8 as an integral unit. Reference numeral 23 denotes an unwinding crank, and 24 an unwinding knob.

The operation of the device can easily be understood by the following example.

Assume first, the photographer desires to make an $O_V$ adjustment. To accomplish this, rings 19 and 20 must be rotated as a unit independent of ring 7. Lever 16 is depressed and operating ring 8 is rotated. The rotation of operating ring 8 rotates, $S_V$ indicating ring 20 via projection 20a, $O_V$ interlocking ring 18 via locking projection 18d, and $O_V$ indicating ring 19, which is secured to ring 18. On the other hand, because of the locking of ring 9 by locking member 10, and the desengagement of lever 16 from a locking relationship with ring 18, rings 9, 12, and 7 will remain stationary. Ring 5 and contact 22, of course, rotate with every rotation of operating ring 8. As a result of the latter operation, the contact 22 changes the resistance in the circuit, the $X_V$ indication is unchanged, the $S_V$ indication is unchanged, but the $O_V$ indication is changed depending on the amount of rotation of operating ring 8.

Next assume the photographer wants to change the $S_V$ indication. This is accomplished by pulling up and turning operating ring 8, resulting in rotation of $S_V$ indicating ring 20. The pulling up of ring 8 releases the lock between rings 8 and 18. Rings 9, 12, 18, 19 and 7 remain stationary. Of course, the contact 22 is also rotated.

Finally assume the operator wants to alter the $X_V$ indication. This is accomplished by depressing button 11 and rotating operating ring 8, resulting in the rotation of all three indicating rings, 19, 20 and 7, as a unit. Specifically, the depression of button 11 unlocks ring 9, which, as explained previously is rotationally fixed to ring 12 and $X_V$ indicating ring 7. The $S_V$ indicating ring rotates integrally with ring 8 because of projection 20a. The $O_V$ indicating ring 19 rotates integrally therewith because of the fixed attachment to ring 18 and the lock between rings 18 and 8. The $X_V$ indicating ring 7 rotates integrally therewith because of the engagement of lever 16 and the friction between rings 12 and 18.

The above-mentioned example is constructed with priority given to the camera's unwinding shaft, however, it is needless to say tht similar arrangement can be applied to other component parts of the camera. It goes without saying that the method of indication in the above-mentioned embodiment is only an example, and if the relationship of engagement and disengagement with the indicator members is followed, the number of sets can be increased, and the combination of indications can be changed as desired.

What is claimed is:

1. In a camera of the type having a variable impedance, the value of which constitutes one of the inputs of an exposure control circuit, a manually operated operating ring 8 for altering the value of said variable impedance, and a film sensitivity indicating ring 20 rotatably fixed to said operating ring to rotate therewith, the improvement comprising,
  a. a first exposure correction indicating ring 19,
  b. a second exposure correction indicating ring 7,
  c. first interlocking means (18 and 8) for rotatably interlocking said operating ring and said first exposure correction indicating ring, said first interlocking means being manually disengagable to permit said operating ring to be rotated independently of said first exposure correction indicating ring,
  d. second interlocking means (16 and 18) for rotatably interlocking said first and second exposure correction indicating rings, said second interlocking means being manually disengagable to permit said first exposure correction indicating ring to be rotated independently of said second exposure correction indicating ring, and
  e. third manually disengagable locking means (9, 10, and 11) for preventing rotation of said second exposure correction indicating ring, whereby selective operation of said manually controlled interlocking means plus rotation of said operating ring causes selective rotation of one, two and three of said indicating rings.

2. A camera as claimed in claim 1 wherein said first exposure correction indication ring is positioned above said film sensitivity indicating ring and has a window therein for permitting viewing of a part of said film sensivitity indicating ring, and said second exposure correction indication ring is positioned above said first exposure correction indication ring and has windows therein to permit viewing of a part of said first exposure correction indication ring and said part of said film sensitivity indication ring.

3. A camera as claimed in claim 1 wherein said first interlocking means comprises a first interlocking ring (18) fixedly attached to said first exposure correction indication ring, said first interlocking ring having recesses in a peripheral portion thereof and said operating means having a projection for intermeshing with said recesses, and spring biasing means biasing said operating ring along an axis perpendicular to the plane of rotation thereof to cause said projection and recesses to intermesh and interlock said first interlocking ring and said operating ring.

4. A camera as claimed in claim 3 wherein said second interlocking means comprises, a second interlocking ring fixedly attached to said second exposure correction indication ring to rotate integrally therewith, a second group of recesses on said first interlocking ring, a projection on said second interlocking ring intermeshing with said second group of recesses to lock together said first and second interlocking rings, and a manual lever selectively actuable to disengage said projection from said second group of recesses.

* * * * *